United States Patent [19]

Sakunaga et al.

[11] Patent Number: 5,058,989
[45] Date of Patent: Oct. 22, 1991

[54] TRANSMISSION TYPE SCREEN AND METHOD OF MANUFACTURING THE SAME

[75] Inventors: Kenichi Sakunaga, Toyama; Mizuo Okada, Yokohama, both of Japan

[73] Assignee: Mitsubishi Rayon Co., Ltd., Japan

[21] Appl. No.: 676,789

[22] Filed: Mar. 28, 1991

Related U.S. Application Data

[62] Division of Ser. No. 441,385, Nov. 27, 1989.

[30] Foreign Application Priority Data

Nov. 28, 1988 [JP] Japan .................. 63-300064
Nov. 29, 1988 [JP] Japan .................. 63-301690

[51] Int. Cl.$^5$ ............................ G03B 21/60
[52] U.S. Cl. .................. 359/455; 359/443
[58] Field of Search .......... 350/117, 127, 128

[56] References Cited

U.S. PATENT DOCUMENTS

| | | | |
|---|---|---|---|
| 1,824,353 | 9/1931 | Jensen | 350/117 |
| 2,016,185 | 10/1935 | Thomson | 350/117 |
| 2,028,496 | 1/1936 | Chiti | 350/117 |
| 3,561,840 | 2/1971 | Seki et al. | 350/128 |
| 4,006,965 | 2/1977 | Takada et al. | 350/127 X |
| 4,566,756 | 1/1986 | Heijnemans | 350/128 X |

*Primary Examiner*—Richard A. Wintercorn
*Attorney, Agent, or Firm*—Brumbaugh, Graves, Donohue & Raymond

[57] ABSTRACT

A transmission type screen having a screen body constituted by at least one plastic sheet formed of a multiplicity of transparent plastic strands arranged in the shape of a sheet, each the strands being welded together at outer surfaces thereof. Each of the transparent strand may have a main portion and another portion different from the main portion in terms of optical effects. This transmission type screen is manfactured by spinning off the transparent strands from a spinning nozzle while aligning the strands; welding each adjacent over of the strands to form a sheet; and forming a screen body from at least one sheet obtained in this manner.

8 Claims, 8 Drawing Sheets

TRANSMISSION TYPE SCREEN AND METHOD OF MANUFACTURING THE SAME

This application is a division of application Ser. No. 07/441,385 pending, filed on Nov. 27, 1989.

BACKGROUND OF THE INVENTION

This invention relates to a transmission type screen used as a display screen for projection television, microfilm readers and so on, and to a method of manufacturing this type of screen.

Transmission type screens are widely used as a means for displaying film-advertisements, projected television images, microfilm images, and so on. Ordinarily, this kind of transmission type screen has a certain type of lens disposed on the incidence or viewing surface to make the screen brighter as seen from the observation side and/or to increase the viewing angle. For example, the use of double-side lenticular lenses, fly-eye lenses or the like are disclosed in Japanese Patent Unexamined Publication No. 58-59436, Japanese Utility Model Publication No. 52-4932, Japanese Patent Unexamined Publication Nos. 57-81254, 57-81255 and 58-108523.

To obtain the desired characteristics of these types of screens, the positional relationship between lenticular lenses or the fly-eye lenses on both sides of the screen must be controlled with accuracy. For example, in the case of lenticular lenses having pitches of about 1 mm, there is a need for a degree of positional accuracy such that both extent of misalignment of axes of the two surfaces and variation in the plate thickness are limited to a range of $\pm 2\%$, i.e., to $\pm 20$ $\mu$m. If errors in these factors are not limited to this range, several problems may be encountered, including that of deterioration of color balance, that of a reduction in the visual field range, and that of non-uniformity of colors in the image area.

Almost all double-side lenticular lens type screens put to practical use at present are products formed of methacrylic resins, and the following methods are adopted for forming them:

1. a method of forming an extruded resin sheet with rolls;
2. a casting method based on cell casting; and
3. a compression molding method based on heat pressing. In each method, a pattern of a mother die is transferred directly or indirectly to a resin sheet.

To form a lenticular lenses with accuracy, there is a need for

A high dimensional precision for mother dies for the two lens surfaces;

B evenness of the mold temperature at the time of forming and uniformity of the mold shrinkage of the resin; and C high accuracy of positioning of the two dies for both surfaces of a screen and prevention of play In a case where a 1 m square double-side lenticular lens type screen having lenses pitches of 1 mm and a thickness of 1 mm is formed while the allowable accuracy range of each of the lateral misalignment and the plate thickness is $\pm 2\%$, the mutual positional accuracy of the two surfaces of the double-side lenticular lens type screen must be maintained so that errors in the factors relating to A, B and C are limited to a range of $\pm 20$ $\mu$m in the lateral direction and in the direction of plate thickness.

However, the linear expansion coefficient of metals are, for example,

| | |
|---|---|
| steel: | $1.1 \times 10^{-5}$ 1/°C. |
| aluminum: | $1.7 \times 10^{-5}$ 1/°C. |
| brass | $1.8 \times 10^{-5}$ 1/°C. | and if the temperature changes by 1° C., the calculated, expansion contraction of steel per unit length cf 1 m is 11 $\mu$m, that of aluminum is 17 $\mu$m, and that of brass is 18 $\mu$m. Techniques and equipment of an extremely high order are therefore needed for working the molds with improved accuracy (including the accuracy with which the temperature in the factory is controlled), for controlling the forming temperature and for positioning the dies for the two lens surfaces.

Recently, the development of large television display units having finer pixels are promoted, and techniques for forming screen lenticular lenses having smaller pitches are also required. As described above, at the present industrial technology level, it is difficult to remarkably improve the accuracy with which a large lenticular lens type screen, e.g., a 1 m square plastic lenticular lens type screen is formed, i.e., to limit errors in positioning the obverse and reverse surfaces of the lenticular lens type screen to a range narrower remarkably than that mentioned above.

If transparent cylindrical members are used in such a manner that the upper half and the lower half of each cylindrical member are respectively used as lenticular lens units for forming the incidence and viewing surfaces, at least the positional relationship between the lenticular lenses on both surfaces of the screen can be maintained easily. Examples of transmission type screens formed by using such a transparent cylindrical members are disclosed in Japanese Patent Unexamined Publication No. 47-28925, Japanese Utility Model Unexamined Publication Nos. 59-121647, 59-121648, and 59-123850.

As can be immediately recognized in trial manufacture of these examples, any one of these examples entails a problem in that gaps are inevitably formed between the cylindrical members and light passing straight though these gaps disturbs the observation of an image (see-through, hot band and the like take place). In practice, it is impossible to provide screens having good properties.

The variation in the diameter of cylindrical members formed of transparent fibers available at present is at least $\pm$ several percents, gaps are inevitably formed between such cylindrical members if the cylindrical members are simply arranged. Even if the cylindrical members are arranged while being pressed against each other, the gaps cannot be completely eliminated. That is, the formation of gaps cannot be prevented unless a means for forcibly fixing the cylindrical members is used.

Japanese Patent Unexamined Publication No. 47-28925 discloses a transmission type screen which is constructed in such a manner that lengthwise cylindrical lenses are arranged to constitute a layer one surface of which is coated with a dark color paint while some portions are left uncoated, thereby enabling scattering of emanating light. However, no method is specified for manufacturing this transmission type screen, and this type of product has not been put to practical use in the industry. It is therefore possibly considered that no specific process for this type of lens screens has been established, and that the formation of gaps cannot be eliminated and the leakage of light through the gaps cannot be prevented during use.

SUMMARY OF THE INVENTION

The present invention has been achieved in consideration of these circumstances, and it is a first object of the present invention is to provide a high-performance screen formed of transparent strands arranged with accuracy in a sheet-like shape without any gap.

It is a second object of the present invention to provide a method of manufacturing a transmission type screen by using transparent strands.

It is a third object of the present invention to provide an improved transmission type screen formed from transparent strands by a conjugate spinning technique, each strand having a main portion and another portion formed integrally with the main portion and having optical functions different from those of the main portion.

To achieve these objects, according to the present invention, there is provided a transmission type screen having a screen body constituted by at least one plastic sheet formed of a multiplicity of transparent plastic strands arranged parallel in the shape of the sheet, each of the strands being welded to the adjacent strands at outer peripheral surfaces thereof.

According to the present invention, there is also provided a method of manufacturing a transmission type screen including the steps of: welding a multiplicity of transparent plastic strands at adjacent portions of the same while aligning the transparent strands after spinning or welding the strands immediately below the spinning position to integrally form a sheet; and forming a screen body from at least one sheet obtained in this manner.

According to the present invention, on the basis of its another concept, there is provided a transmission type screen having a screen body constituted by at least one plastic sheet formed of a multiplicity of transparent plastic strands arranged parallel in a shape of the sheet, each of the strands being welded to the adjacent strands at outer surfaces thereof, each of the transparent strands having a portion in cross-section serving to provide an optical function different from the functions of a main portion of the strand.

According to the present invention, on the basis of still another concept, there is provided a method of manufacturing a transmission type screen, including, for spinning a multiplicity of transparent plastic strands in a melt spinning manner, spinning in a conjugate manner a melt for forming main portions of the transparent strands and another melt for providing an optical function different from those of the main portions; welding adjacent portions of the transparent strands while aligning the same after spinning or welding the transparent strands immediately below the spinning position to integrally forms a sheet; and forming a screen body from at least one sheet obtained in this manner.

BRIEF DESCRIPTION OF THE DRAWINGS

FIGS. 1 to 10 show examples of a transmission type screen in accordance with the present invention, each of the examples shown in FIGS. 1 to 5 being formed of transparent strands of a single composition, each of the examples shown in FIGS. 6 to 10 being formed of transparent strands having two compositions different from each other in optical functions;

DESCRIPTION OF THE PREFERRED EMBODIMENTS

The present invention will be described below with reference to the accompanying drawings.

Figure 1:
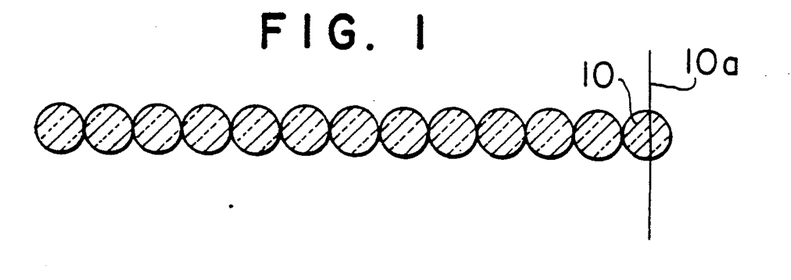
FIGS. 1 to 10 are cross-sectional views of portions of the transmission type screens.
Figure 2:
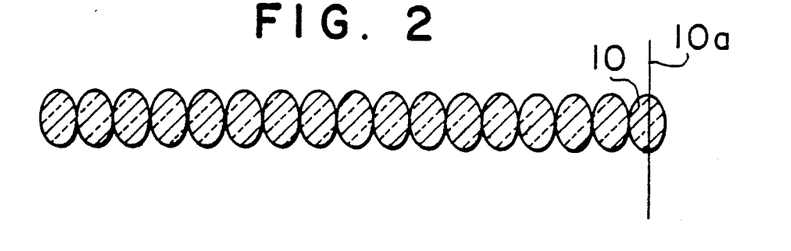
Figure 3:
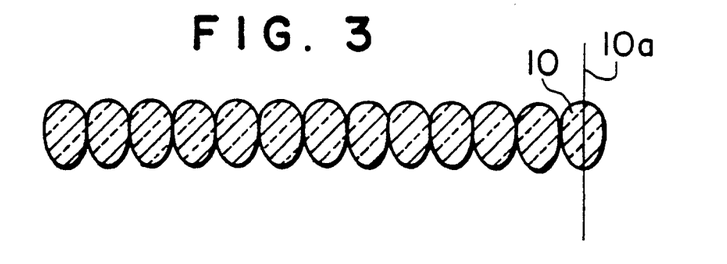
Figure 4:
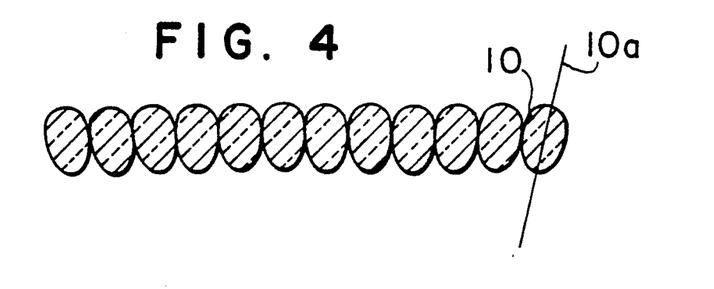
Figure 5:
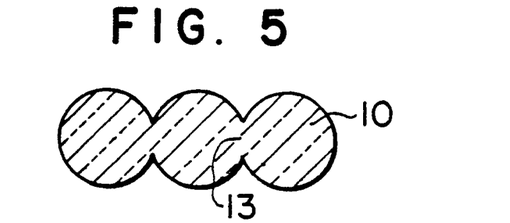

Referring to FIGS. 1 to 5, reference numeral 10 designates transparent strands, formed of a plastic having a single composition. Of the strands 10 shown in FIG. 1 to 3, those of FIG. 1 have a circular cross-sectional shape, those of FIG. 2 have an elliptic cross-sectional shape, and those of FIG. 3 have an ovoid cross-sectional shape. In the example shown in FIG. 4, the same transparent strands 10 as those of FIG. 3 are arranged in such a manner that the inclinations of their optical axes 10a are gradually changed to obtain an optical directionality toward the center of the screen. As shown in FIG. 5, the outer surfaces of the transparent strands 10 adjacent to each other are welded at their outer peripheral surface part 11 to integrally join the strands 10 together, thereby forming a sheet-like transmission type screen.

FIGS. 6 to 10 show embodiments of another type in accordance with the present invention. In FIGS. 6 to 10, there are shown a transparent plastic strands 10, portions 12 (hereinafter referred to as "difference portions") having optical functions different from those of main portions 11. Providing the optical function different from those of the main portions means that the optical effects of the different portions based on the transmittance and/or the refractive index are different from those of the main portions, that is, if the main portions are colorless and transparent, the difference portions may be colored or contain a light diffusing agent, may be formed of a material having a refractive index different from that of the main portions, or may be formed of a material which has a transmittance extremely small as compared with the main portions or which does not transmit any light.

Figure 6:
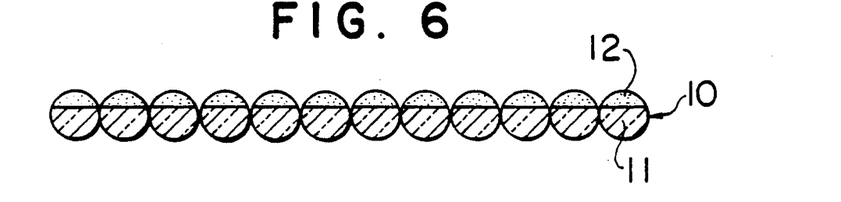

In the example shown in FIG. 6, the different portions 12 containing a light diffusing agent are formed as portions of transparent strands 10 having a circular cross-sectional shape, i.e., on the viewing side of transparent main portions 11. The different portions 12 extend in the longitudinal direction of the transparent strands 10. This structure enables the imaging portion of the screen to be reduced in thickness and, hence, achieves an improvement in resolution. In addition, the desired amount of transmission light and, hence, the brightness of the screen can be maintained since the main portions 11 are transparent.

Figure 7:
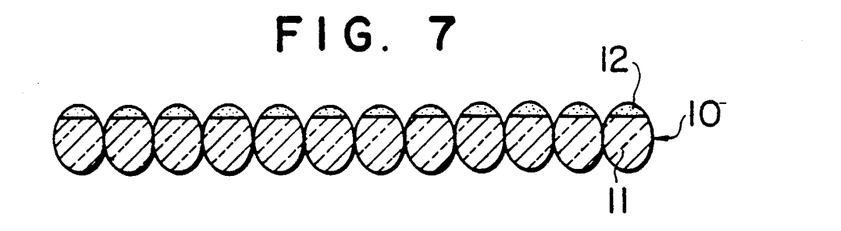

The example shown in FIG. 7 is substantially the same as that shown in FIG. 6 but the transparent strands 10 of this example have an elliptic cross-sectional shape. The main portions 11 and the different portions 12 are formed in the same manner as the example shown in FIG. 6.

Figure 8:
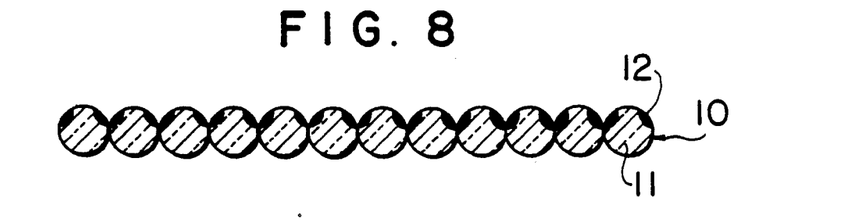

In the example shown in FIG. 8, different Portions 12 are formed as external light absorbing layers in transparent strands 10 having a circular cross-sectional shape on the observation side of the same. This structure enables prevention of reflection of unnecessary external light by absorbing the same, thereby improving the contrast of the screen.

Figure 9:
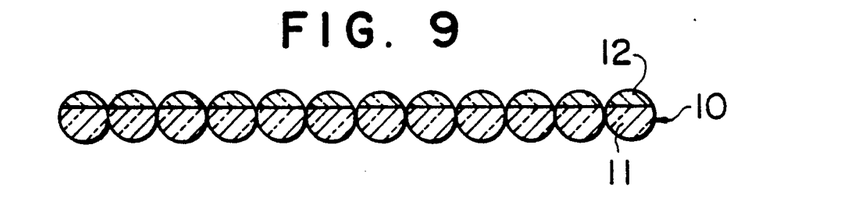

In the example shown in FIG. 9, main portions 11 and different portions 12 of transparent strands 10 having a circular cross-sectional shape are formed of plastics having different refractive indexes. The spreading of transmission light and, hence, the viewing range of the screen can be controlled by selecting a difference between the refractive indexes.

Figure 10:
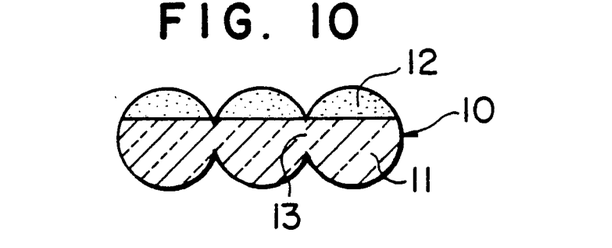

As shown in FIG. 10, the outer surfaces of the transparent strands 10 adjacent to each other are welded at 13 to integrally connect the strands, as in the case of welding shown in FIG. 5, thereby forming a sheet-like transmission type screen. In accordance with the present invention, it is preferable for the transmission type screen to be formed as one piece sheet, as described above. However, the present invention is not limited to this construction, and two or several piece sheets may be joined together to form one screen. Even in a case where a plurality of sheets are joined together, the pitch accuracy is greatly improved as compared with a case where independent strands are simply arranged.

The transparent strands 10 in accordance with the present invention may be formed of a plastic having improved optical transmission properties, e.g., a thermoplastic polymer, such as an acrylic polymer, a polycarbonate polymer or a polyacrylate, or a crosslinking-hardening polymer, such as a crosslinked silicone polymer, a crosslinked arylate polymer or an ion-crosslinked polymer. The thickness of the transparent strands 10 selected to contribute to the realization of a finer screen pitch is about 0.1 to 1.5 mm. The outer surfaces of the transparent strands 10 may be smooth or may have very fine irregularities. The transparent strands 10 may be colored with a suitable coloring agent or a light diffusion agent may be mixed in the material of the transparent strands 10.

In accordance wit this type of embodiment of the present invention, as described above, each of the transparent strands 10 consists of the main portion 11 and the different portion 12. Accordingly, while the main portion 11 is formed of one of the above-mentioned plastics, the different portion 12 may be formed of a material consisting of the same plastic and a light diffusion agent mixed therein in accordance with the examples shown in FIGS. 6 and 7, may be formed of a plastic containing a black pigment in accordance with the example shown in FIG. 8, or may be formed of a plastic having a suitable refractive index selected from the above-mentioned plastics in accordance with the example shown in FIG. 9.

The above-described types of transmission type screens can be manufactured by melt spinning. First, a method of manufacturing screens in accordance with the embodiments shown in FIGS. 1 to 5 will be described below with reference to FIGS. 11 and 12. Reference numeral 1 designates an extruder and a reference numeral 2 designates a die having a nozzle, respectively. A molten plastic is discharged through orifices of the nozzle. The orifices may be arranged to facilitate spinning of a multiplicity of strands. To stabilize the discharge rate, a gear pump of a fined displacement type may be provided.

Figure 11:
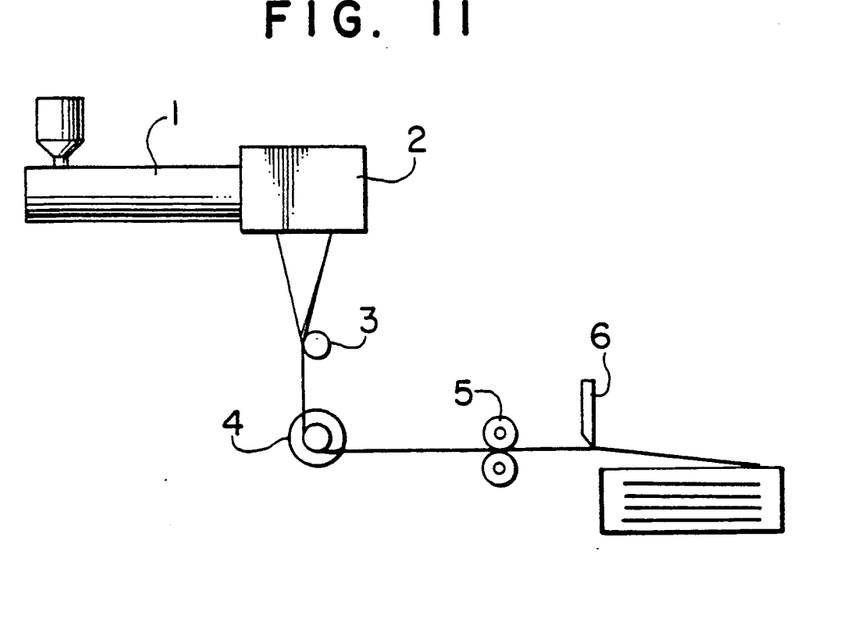
FIGS. 11 to 12 are schematic side and front views of an apparatus for a manufacture method of the present invention.
Figure 12:
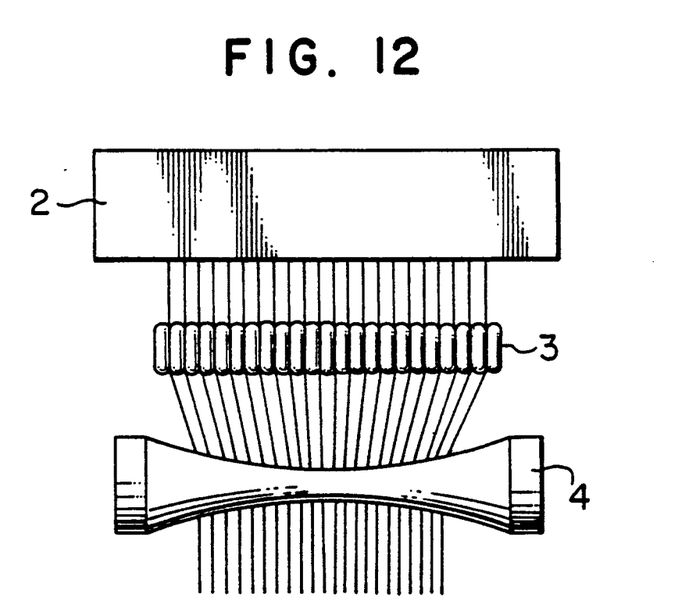

Extruded strands are maintained in a mutually-non-contact state by a spinning alignment guide 3 disposed right below the nozzle, thereby controlling the postures of the strands. The strands are thereafter led to the next processing station. It is therefore preferable for the spinning alignment guide 3 to have grooves as illustrated in FIG. 12. The strands are thereafter passed through a welding guide 4 having a concaved cross-section with its deepest center, so that the outer surfaces of adjacent strand come together and are then welded to each other. The spun strands are thereby formed integrally into a predetermined shape sheet-like such as that shown in FIG. 5, thereby obtaining a transmission sheet. In FIG. 11, a reference numeral 5 designates nip rollers for spinning strands, and a reference numeral 6 designates a cutter.

In a case where a screen such as that shown in FIG. 4 is manufactured by this method, a spinning guide may be used which has grooves gradually included so that the optical axes of extruded strands having an ovoid cross-sectional shape are inclined as shown in FIG. 4. Thus, this type of screen can also be manufactured by a system generally equal to that shown in FIG. 11.

Figure 13:
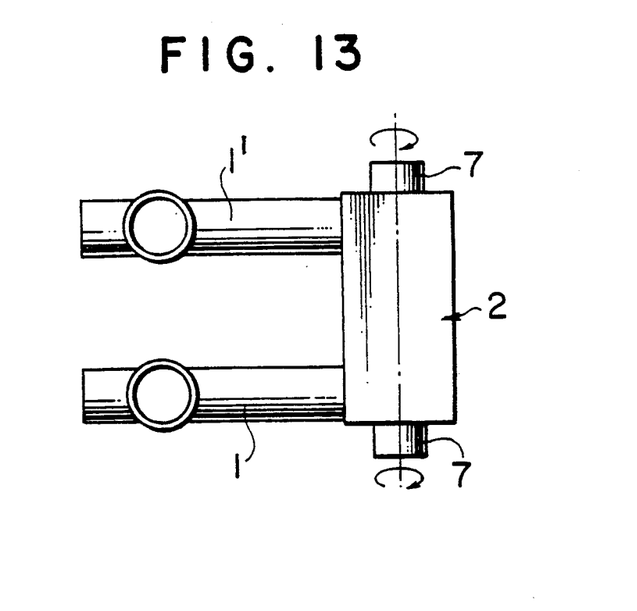
FIGS. 13 and 14 are schematic plan and side views of an apparatus for another manufacture method of the present invention.
Figure 14:
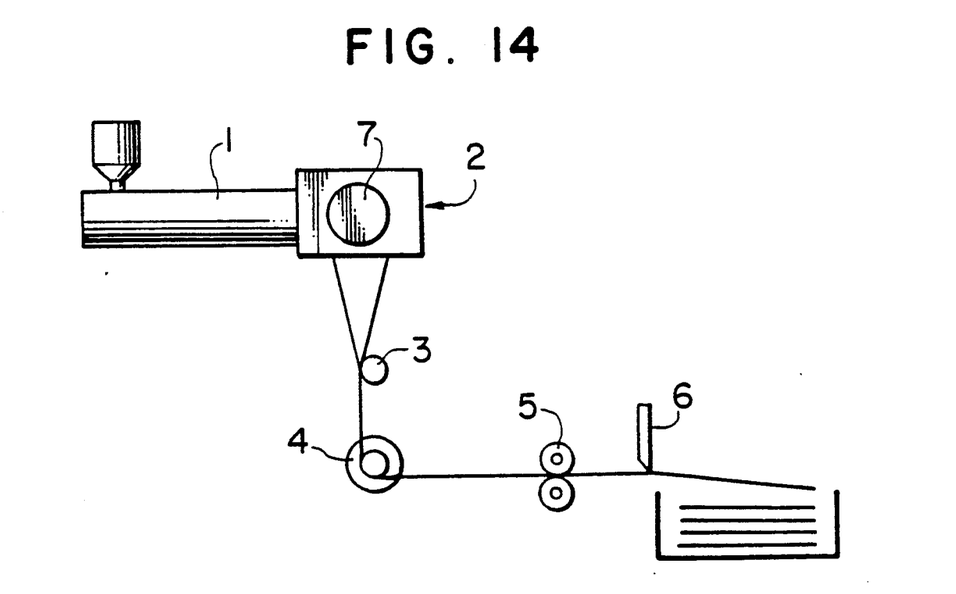

Next, a method of manufacturing screens in accordance with the embodiments shown in FIGS. 6 to 10 will be described below with reference to FIGS. 13 and 14. FIG. 13 is a top view of an apparatus used in accordance with this method, and FIG. 14 is a side view of the same.

A first extruder 1 for providing a melt for forming main portions 11, and a second extruder 1' for providing another melt for forming different portions 12 are provided. A die 2 has a nozzle having orifices (not shown) through which two molten plastics are discharged. Gear pumps 7 are used to control the rate at which the molten materials separately supplied to the die.

Strands are formed by spinning using the two molten materials in a conjugate manner and are maintained out of contact with each other by a spinning alignment guide 3 similar to that shown in FIG. 12 and disposed right below the nozzle, thereby controlling the postures of the strands. The strands are thereafter supplied to the next processing step. It is therefore preferable for the spinning alignment guide 3 to have grooves as illustrated in FIG. 12. The strands are thereafter passed through a welding guide 4 having a concave cross-section with the deepest center so that the outer surfaces of adjacent strands gradually come together and therefore are welded to each other. The spun strands are thereby formed integrally into a predetermined shape sheet such as that shown in FIG. 10, thereby obtaining a transmission sheet. In FIG. 14, a reference numeral 5 designates nip rollers for spinning strands, and a reference numeral 6 designates a cutter.

To manufacture a screen by this method, it is preferable to spin and align strands while controlling the postures of the same so that the main portions 11 and the different portions 12 of the transparent strands 10 face in predetermined directions. In the examples shown in FIGS. 6 to 10, all the different portions 12 are formed perpendicularly to the optical axes. However, the optical axes 10a may be inclined gradually from the center to the peripheral sides of the screen, and the different portions 12 may be positioned according to the inclinations of the optical axes. To manufacture such a screen, a spinning alignment guide having grooves gradually inclined for the inclinations of the optical axes may be used, thereby enabling use of a system generally equal to that shown in FIG. 14.

Figure 15:
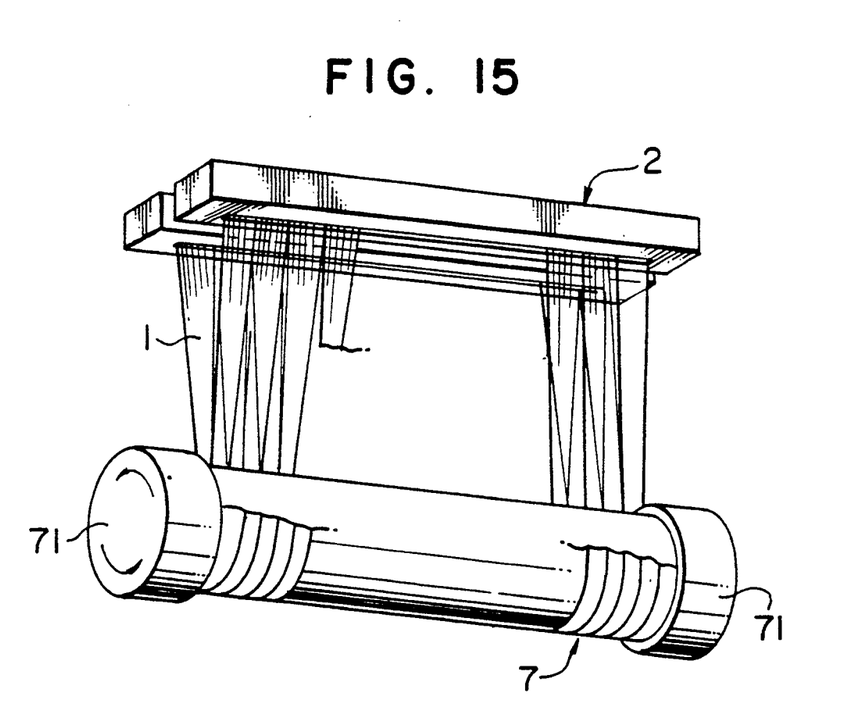
FIG. 15 is a perspective view of a portion of an apparatus for still another manufacture method of the present invention.

In a case where a multiplicity of transparent plastic strands 10 are formed by spinning a melt as shown in FIG. 15, a group of adjacent spinning nozzles 20 may be disposed in alignment with each other while adjacent nozzle holes 21 of each nozzle are arranged at small intervals or are formed so as to overlap each other at least at the outlet end, thereby enabling the outer surfaces of the transparent strands 10 to be welded to each other at the outlet of the spinning nozzles 20 to form an integral sheet.

In this case, the screen may be manufactured in such a manner that tape-like sheets each consisting of several ten to several hundred strands are formed as sheet units, are led to a roll 7 having at its opposite ends limit rings 71 as shown in FIG. 15 while the rotational speed of the roll 7 is controlled to maintain a suitable taking-off speed, and are thereafter welded to each other to form one integral sheet.

Figure 16:
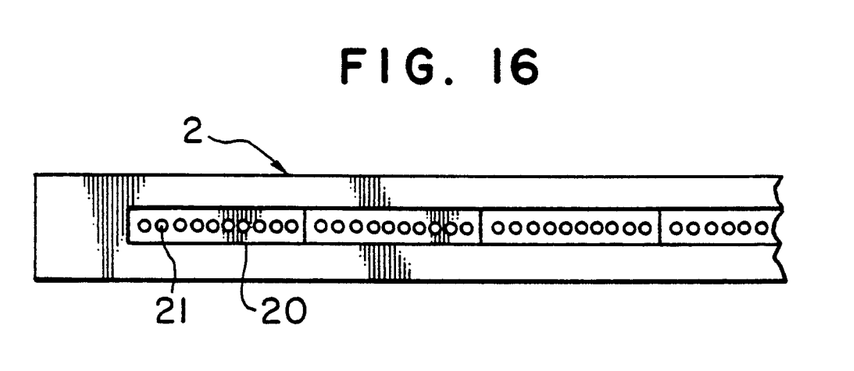
FIG. 16 is a bottom view of a die for use in the apparatus shown in FIG. 15.
Figure 17:
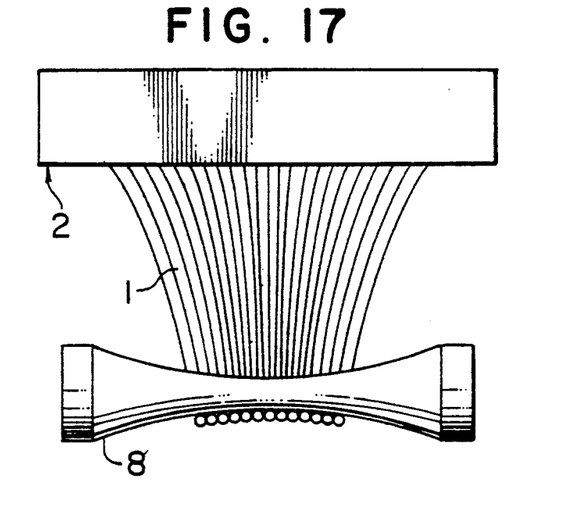
FIGS. 17 and 18 are front and side views of a portion of an apparatus for a further manufacture method of the present invention.
Figure 18:
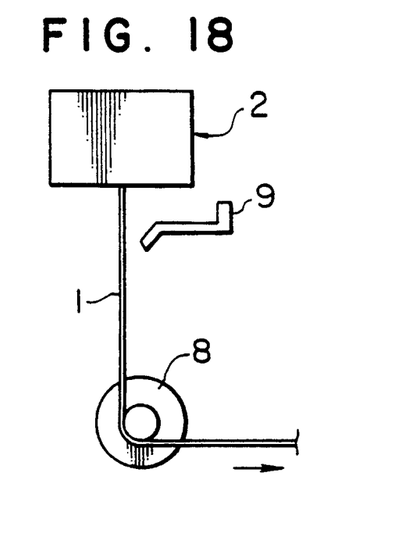
Figure 19A:
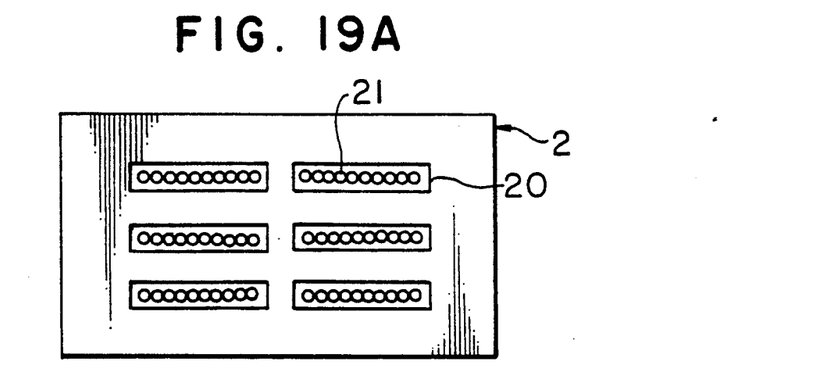
FIGS. 19A and 19B are bottom views of dies for use in the apparatus shown in FIG. 17 and 18.
Figure 19B:
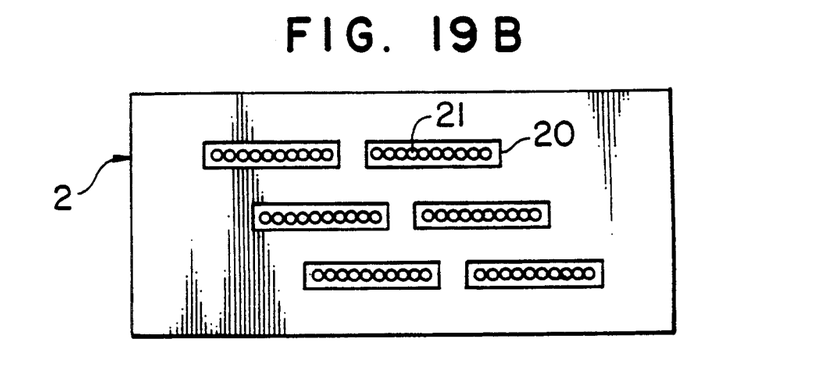

FIGS. 17 to 19 relate to other manufacture methods similar to that shown in FIG. 15. In accordance with these methods, transparent strands extruded from spinning nozzles 20 of a die 2 are brought together by a curvature guide 8 and are taken off as a sheet. In this case, it is preferable to select the diameter d of the nozzle holes and the nozzle hole pitch p so as to satisfy $d<p<2d$. In a case where the cross-sectional shape of the transparent strands is not circular, it is effective to blow air from a cooler 9 to the strands. FIGS. 19A and 19B show another example of the die 2 used for the present invention. The die of FIG. 19A or 19B in which spinning nozzles 20 are arranged in several separate rows instead of being linearly arranged as shown in FIG. 16 is particularly suitable for manufacturing a wide screen.

Thus, the methods shown in FIGS. 15 to 19 can be applied to conjugate spinning using a plurality of extruders and a spinning nozzle having a plurality of flow passages.

For the manufacture of a transmission type screen in accordance with the present invention, it is desirable to use a single sheet for the overall width of the screen. However, it is not possible to do so because of a certain condition relating to the apparatus, unit sheets having a predetermined width may be formed and are joined together by using a bonding agent or an adhesive type.

Figure 20:
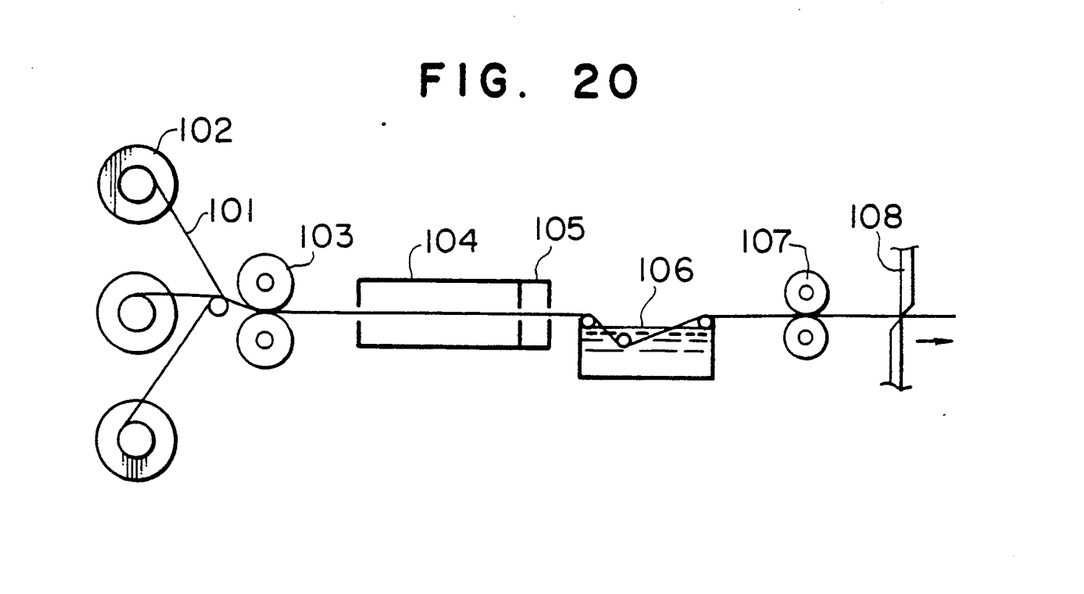
FIG. 20 is a schematic side view of an apparatus for a method of welding sheets.

FIG. 20 shows one possible method for this join. A plurality of transparent strand tapes 101 preliminarily formed to have a predetermined width and wound around a bobbin 102 are unwound and put side by side by first nip rollers 103 and are conveyed to a first heating unit 104 for pre-heating. For heating in the first heating unit 104, hot air may be used or, more preferably, far infrared radiation or laser light may be adopted to avoid twisting of the tapes.

Thereafter, in a second heating unit 105, adjacent portions of the tapes 101 are spot-heated, thereby welding the tapes 101. For heating in the second heating unit 105, hot air may be used but heating using near infrared radiation or laser light is more preferable, as in the case of the first heating unit 104.

The sheet formed by this welding is joined to a cooling bath 106, and welded portions are thereby cooled and solidified. The cooled sheet is taken up by second nip rollers 107 and is thereby cut by a predetermined length by a cutter 108, thereby obtaining a screen having a predetermined width.

(EXAMPLES)

Examples of the present invention will be explained below. Needless to say, it is to be construed that the present invention is not limited to these examples.

EXAMPLE 1

An apparatus such as that shown in FIGS. 11 and 12 was used to manufacture a transmission type screen. A nozzle having 500 orifices was used to supply polyethyl methacrylate to the amount of 1 g/hole, spinning was effected at 250° C., and strands thereby formed were passed through the spinning alignment guide and welding guide having a radius of curvature of 200 mm and were spun by the nip rollers at a speed of 6.74 m/min.

The distance between the nozzle and the spinning guide was 300 mm, and the spinning guide was cooled so that the temperature of its surface was constantly maintained.

The diameter of transparent strands of the sheet thereby obtained was 0.4 mm, the sheet had a width of 20 cm and integrally formed of the strands arranged linearly and uniformly. Excellently, the spot of each single strand among the 500 strands was within a range of 400 ±5 μm. Five sheets having a length of 1 m were formed in this manner, laterally arranged in a straight line and connected to each other by an adhesive sheet, thereby manufacturing a 1 m × 1 m square transmission type screen. Each adjacent strands were fused together along their peripheral surfaces by a length of about 80 μm.

Further, a black ink was applied to grooves formed between the strands on the sides thereof where the screen is not covered with the adhesive film, by using a rubber squeege (of a rubber hardness of 70° moved at a speed of 1.5 m/min under a pressure of 30 kg).

The thus-obtained transmission type screen was tested by being attached to a projection TV. As a result, it was found that the screen was bright when it is seen obliquely as well as when seen frontways, and both the resolution and the color tones were good.

Figure 21:
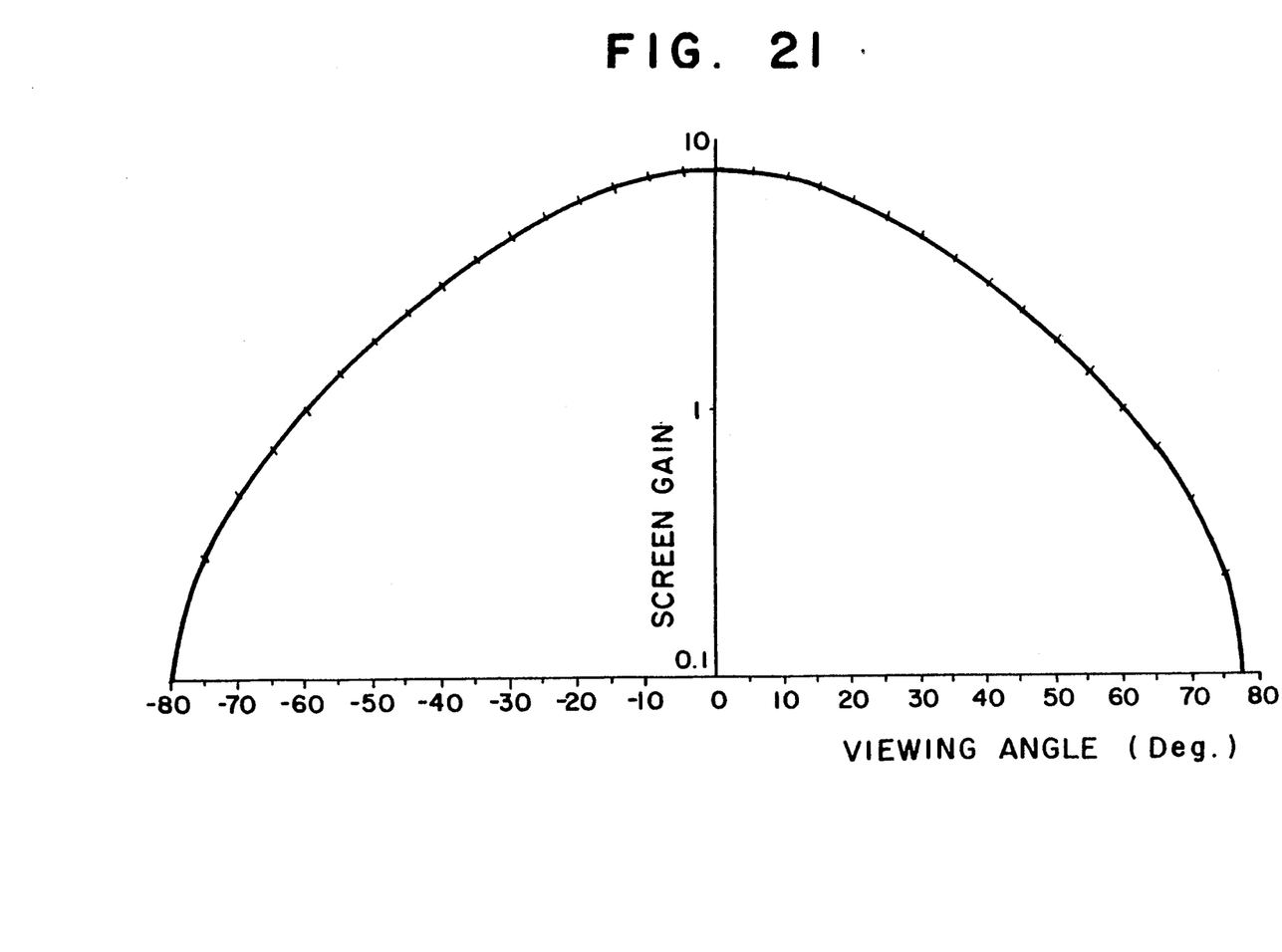
FIG. 21 is a graph showing a curve of the screen gain of the transmission type screen in accordance with Example 1 with respect to the viewing angle.

A light diffusion sheet was placed on the viewing side of the obtained screen to measure the screen gain with respect to viewing angles. The resulting characteristic curve was as shown in FIG. 21.

EXAMPLE 2

An apparatus such as that shown in FIGS. 12 to 14 was used to manufacture a transmission type screen. The construction of transparent strands 10 was as shown in FIG. 9. Main portions 11 were formed of polymethyl methacrylate having a refractive index $n=1.49$ while different portions 12 were formed of polycarbonate having a refractive index $n=1.6$.

A nozzle having 500 orifice was used to supply polymethyl methacrylate to the amount of 0.7/hole and polycarbonate to the amount of 0.3 g/hole, spinning was effected at 240° C. to extrude side-by-side conjugate strands which were passed through the taking-off alignment guide and welding guide and were taken off by the nip rollers at a speed of 6.74 m/min.

The distance between the nozzle and the spinning guide was 150 mm, and the spinning guide was cooled by force so that the temperature of its surface was constantly maintained.

The diameter of transparent strands of the sheet thereby obtained was 0.4 mm, the sheet had a width of 20 cm and integrally formed of the strands arranged linearly and uniformly. The spot of each single strand among the 500 strands was within a range of 400±5 μm. Five sheets having a length of 1 m were formed in this manner, laterally arranged and joined to each other by an adhesive sheet, thereby manufacturing a 1 m × 1 m square transmission type screen.

Further, a black ink was applied to grooves formed between the strands on the sides thereof where the screen is not covered with the adhesive film, by using a rubber squeeze (of a rubber hardness of 70° moved at a speed of 1.5 m/min under a pressure of 30 kg).

The thus-obtained transmission type screen was tested by being attached to a projection TV. As a result, it was found that the screen was bright when seen obliquely as well as when seen frontways, and both resolution and color tones were good.

EXAMPLE 3

Figure 22:
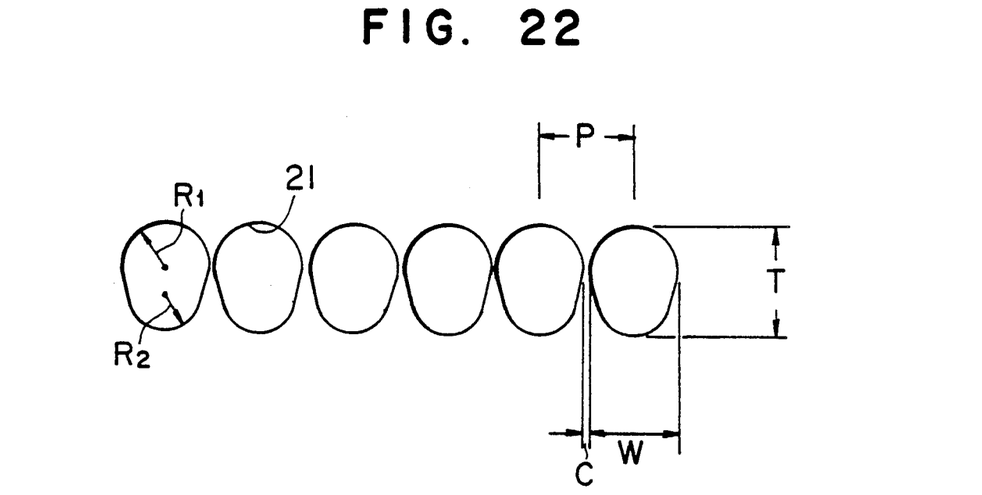
FIG. 22 is an enlarged front view of a nozzle holes of a spinning nozzle used to form Example 3.

An apparatus such as that shown in FIGS. 15 and 16 was used together with nozzles having nozzle holes such as those shown in FIGS. 22 to manufacture a screen.

The sizes of portions of the spinning nozzle as shown in spring FIG. 22 were as follows:

the maximum length T of each nozzle hole = 0.90 mm, the maximum width W of each nozzle hole = 0.75 mm, The pitch P of the nozzle holes = 0.80 mm, the radius of curvature $R_1$ on the incidence side = 0.375 mm, the radius of curvature $R_2$ on the viewing side = 0.3 mm, and the distance C between the nozzles = 0.05 mm. dies in which 40 unit spring nozzles thus specified (100 holes) were arranged while being spaced 1 mm apart from each other were used. Polymethyl methacrylate was supplied to the dies via gear pump while being heated at a temperature of 230° C. and was discharged through the nozzle holes at a speed of 1 m/min while rotating the roll at a peripheral speed of 2 m/min, thereby obtaining a sheet. The transparent strands were welded to each other at the outlets of the spinning nozzles to maintain a sheet-like form.

The sheet thereby obtained was cut by 1.1 m in the longitudinal direction and was tested by being attached to a projection TV while being interposed between a Fresnel lens and a light diffusing sheet which are separately manufactured. As a result, it was found that the viewing range was wide and other improved effects were obtained, having a remarkably excellent color balance.

EXAMPLE 4

A manufacturing apparatus based on the arrangement shown in FIG. 14 with the dies and the curvature guide changed to those shown in FIGS. 17 and 18 was used. A transmission type screen designed to have the type of structure shown in FIG. 8 was manufactured.

Dies were arranged as shown in FIG. 19A, that is, 50 non-circular conjugate holes were arranged in three rows and in two columns, the diameter of each hole was about 1.2 mm, and the pitch of the holes was 1.8 mm.

The main portions were formed of transparent polymethyl methacrylate while the different portions were formed of polymethyl methacrylate with 1% by weight of carbon black mixed therein. The former was supplied at a rate of 0.5 g/min.hole and the latter was supplied at a rate of 0.02 g/min.hole. The die temperature was adjusted to 240° C. Air is linearly blown from a cooler to spun strands to cool the strands. A curvature guide was disposed right below the dies at a distance of 20 cm therefrom. The transparent strands were spun at a speed of 3.9 m/min. while being welded to each other and drawn by nip rollers.

A sheet having a width of 120 mm and improved in quality was thereby obtained, the diameter of each transparent strand of the sheet was approximately 0.4 mm and uniform, and each strand has black stripes.

Four sheets obtained in this manner were welded to each other by using an apparatus such as that shown in FIG. 20, thereby obtaining a transmission screen having a width of 480 mm and a length of 480 mm.

This transmission type screen was tested by being attached to a projection TV together with a Fresnel lens separately manufactured. As a result, it was found that the display surface was bright when seen obliquely as well as when seen frontways, and both the resolution and the color tones were good.

The present invention is based on the constructions described above in detail and the screen in accordance with the present invention is substantially equivalent to the ordinary double-side lenticular lens type screen while being greatly improved in accuracy and while achieving specific optical effects by virtue of the combination of two different materials. The present invention also enables transmission type screens thus improved to be manufactured with a high degree of efficiency at a low cost.

What is claimed is:

1. A transmission type screen comprising a screen body constituted by at least one plastic sheet formed of a multiplicity of transparent plastic strands arranged Parallel in a shape of a sheet, each adjustment ones of said strands being welded to each other at outer surfaces thereof.

2. A transmission type screen according to claim 1, wherein each of said transparent stands constituting said screen body has a portion in a cross-section and serving to provide an optical function different from a functions of a main portion of said strand.

3. A transmission type screen according to claim 1, wherein the cross-sectional shape of each of said transparent plastic strands constituting said screen body is non-circular.

4. A transmission type screen according to claim 2, wherein the cross-sectional shape of each of said transparent plastic strands constituting said screen body is non-circular.

5. A transmission type screen according to claim 1, wherein said screen is combined with a Fresnel lens.

6. A transmission type screen according to claim 2, wherein said screen is combined with a Fresnel lens.

7. A transmission type screen according to claim 1, wherein said screen is combined with a light diffusing sheet.

8. A transmission type screen according to claim 2, wherein said screen is combined with a light diffusing sheet.

* * * * *

UNITED STATES PATENT AND TRADEMARK OFFICE
CERTIFICATE OF CORRECTION

PATENT NO. : 5,058,989

DATED : October 22, 1991

INVENTOR(S) : Sakunaga et al.

It is certified that error appears in the above-identified patent and that said Letters Patent is hereby corrected as shown below:

Column 10, line 51, "constituted by at least one plastic sheet formed of" should read --formed from at least one plastic sheet comprising--;

Column 10, line 53, "Parallel in a shape of a" should read --in parallel to form the--;

Column 10, line 53, "adjustment" should read --adjacent--;

Column 10, line 54, "to each other" should read --together--;

Column 10, line 54, "outer" should read --the outer--;

Column 10, lines 57-60, "constituting said screen body has a portion in a cross-section and serving to provide an optical function different from a functions of a main portion of said strand." should read --comprises at least two portions when viewed in cross-section, said portions having different optical properties.--;

Column 10, line 63, delete "constituting said screen body";

UNITED STATES PATENT AND TRADEMARK OFFICE
CERTIFICATE OF CORRECTION

PATENT NO.   : 5,058,989
DATED        : October 22, 1991
INVENTOR(S)  : Sakunaga, et. al.

It is certified that error appears in the above-identified patent and that said Letters Patent is hereby corrected as shown below:

Column 10, line 67, delete "constituting said screen body".

Signed and Sealed this

Twenty-fifth Day of May, 1993

Attest:

MICHAEL K. KIRK

Attesting Officer

Acting Commissioner of Patents and Trademarks